3,003,302
ROTARY WHEEL SWATH TURNER
Cornelis van der Lely and Ary van der Lely, Maasland, Netherlands, assignors to C. van der Lely N.V., Maasland, Netherlands, a Dutch limited company
Filed Sept. 30, 1957, Ser. No. 686,960
Claims priority, application Netherlands Sept. 29, 1956
6 Claims. (Cl. 56—370)

The invention relates to devices for working crop or the like material lying on the ground.

Devices of this kind are known by which a swath or strip of crop or the like material lying on the ground is turned by a group of at least two rake wheels and by which the crop displaced toward one side by the foremost of the rake wheels is further urged toward the same side by the second rake wheel. Known constructions, however, have the disadvantage that the swath being formed is not always deposited at the side of the rake wheels in a uniform shape with a uniform width and thickness.

It is an object of the invention to obviate these disadvantages.

In accordance with the invention the axes of rotation of the rake wheels of a group of rake wheels are at different angles relative to the direction of travel of the device. By correct choice of the angles between the axes of rotation of the rake wheels and the direction of travel, a more effectively turned swath or a swath of more uniform shape may be obtained.

A further object of the invention is to provide an improved implement adapted for selective use as a tedder or swath turner or side delivery rake.

The above, and other objects, features and advantages of the invention will be apparent in the following detailed description of illustrative embodiments thereof, which is to be read in connection with the accompanying drawings forming a part hereof, and wherein.

Figure 1:
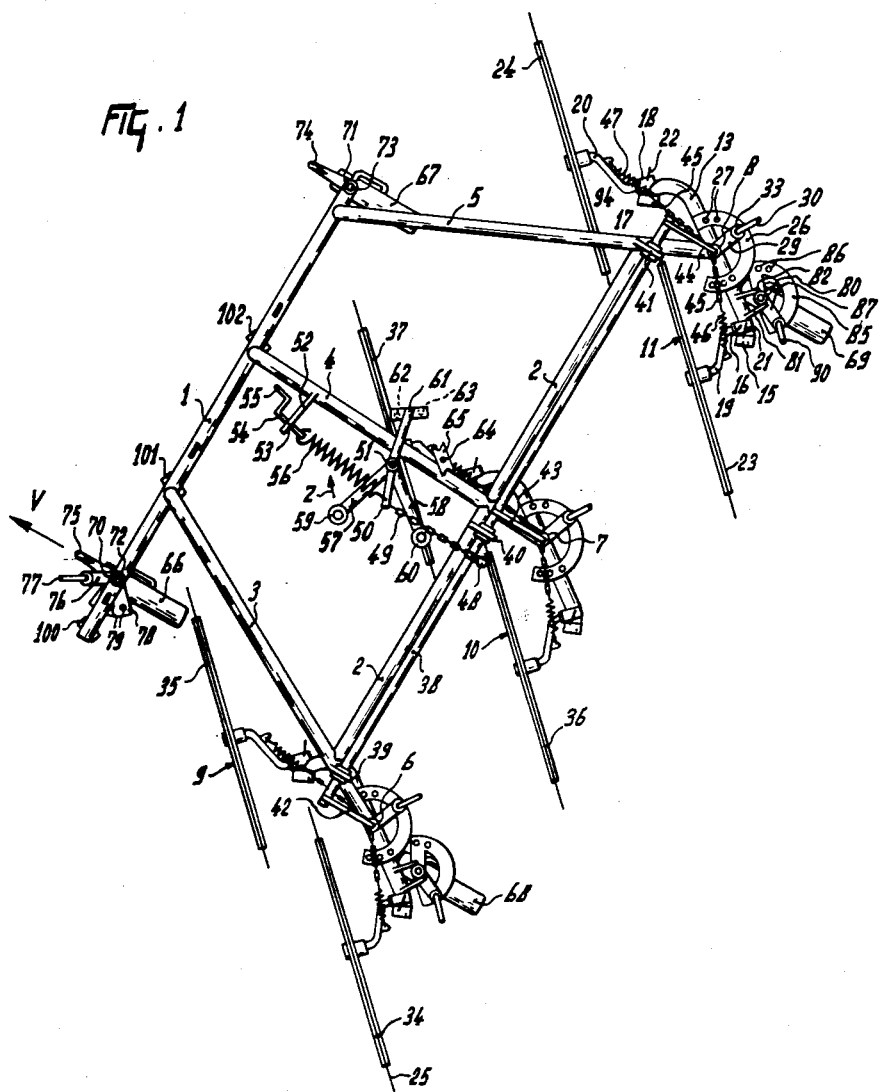
FIGURE 1 is a plan view of a device provided in accordance with the invention for operating as a swath turner.

The device comprises two longitudinal parallel beams 1 and 2, the beam 2 being located higher than the rake wheels. The beams 1 and 2 are connected with each other by the beams 3, 4 and 5, which extend from the beam 1 in an arch upwards to the beam 2, beyond which they curve downwards and support vertical bearings 6, 7 and 8. To the bearings 6, 7 and 8 are connected groups of rake wheels 9, 10 and 11, which are identical in construction. The group 11 will next be described more fully.

Figure 4:
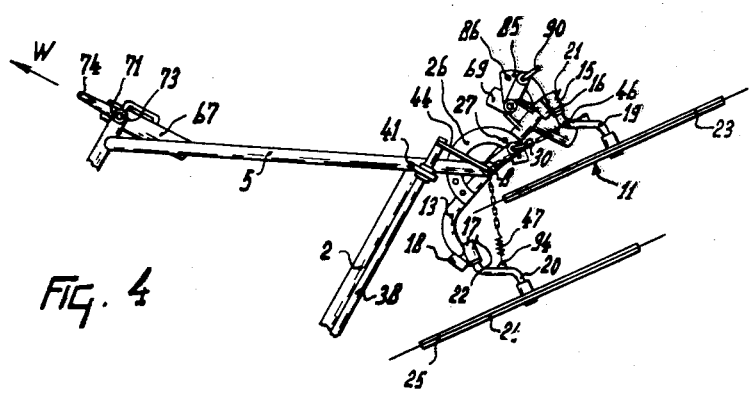
FIGURE 4 is a fragmentary view of the device showing the rake wheels aligned for tedding operation.
Figure 6:
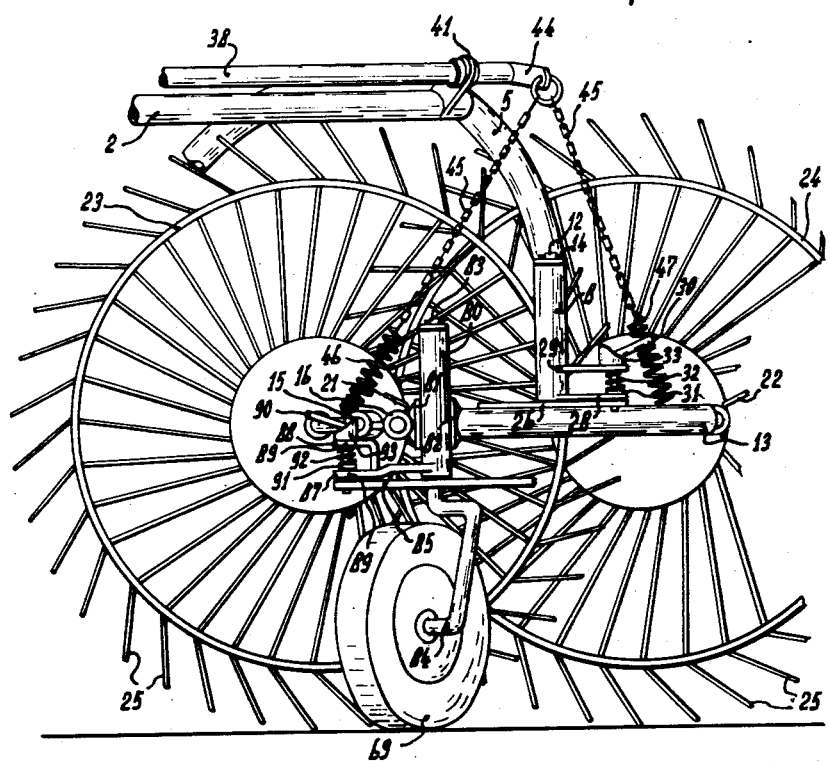
FIGURE 6 is a view of a group of rake wheels taken in the direction of arrow I, in FIG. 5.

The group 11 is provided with a vertical shaft 12, (FIG. 6) which is rotatable in the bearing 8. At the lower end of the shaft 12 is provided a supporting beam 13 and through the upper end of the shaft 12 extends a pin 14 which locks the shaft 12 against axial displacement in the bearing 8. At one end, the support 13 is provided with bearings 15 and 16 and at the other end with bearings 17 and 18 (FIG. 4). In the bearings 16 and 18 are rotatably journalled cranks 19 and 20 which are safeguarded from displacement in the bearings by means of pins 21 and 22 which extend through the bearings 16 and 18 and engage the cranks 19 and 20. On the cranks 19 and 20 are rotatably journalled rake wheels 23 and 24, which are provided with tines 25. To the supporting beam 13 is secured an arcuate strip 26 which is provided with holes 27. To the bearing 8 are secured extensions 28 and 29 through which extends a locking pin 30. The locking pin 30 is provided with a collar 31 and between the collar 31 and the extension 29 the pin 31 is encircled by a spring 32. At the extension 29, surrounding the pin 30, a second cylindrical collar 33 is provided, which extends obliquely in the upward direction and against which bears the end of the pin 30. It is thus possible to fix the pin 30 against the force of the spring 32 in a lifted position so that the collar 31 does not bear against the extension 28. In this lifted position, the handle of the pin 30 bears on the high portion of the edge of the collar 33. The groups 9 and 10 are constructed in the same manner as the group 11; the group 9 comprises two rake wheels 34 and 35 and the group 10 includes two rake wheels 36 and 37.

A lifting device is provided to permit lifting the rake wheels free from the ground and, if desired, for adjusting the pressure of the rake wheels on the ground. This lifting device comprises a rod 38, which is journalled in bearings 39, 40 and 41 secured to the beam 2. The rod 38 has connected thereto levers 42, 43 and 44, the ends of which are located over the rotary shafts 12. The rake wheels 23 and 24 are connected with a lever 44 by means of chains 45 and springs 46 and 47. In the manner in which the rake wheels 23 and 24 are connected with the lever 44, the rake wheels of the groups 9 and 10 are linked with the arms 42 and 43. With the rod 38 is furthermore connected an arm 48, which is connected by means of a chain 49 with an arm 50 rotatable about a shaft 51, which is secured to the frame beam 4. To the frame beam 4 is secured an arm 52, which is provided with a threaded hole 53, through which extends a threaded pin 54, which is provided at one end with a crank 55. At its other end, the pin 54 is provided with an eye, through which extends the end of a draw spring 56. The other end of the draw spring 56 is secured to the arm 50, so that this draw spring constitutes a counter-spring for the weight of the rake wheels, which tend to turn the arm 50 about the shaft 51. With the arm 50 are furthermore connected two levers 57 and 58 (see also FIGS. 7 and 8), which are provided with eyes 59 and 60. To the eyes 59 and 60 can be applied a force to turn the arm 50 in the direction of the arrow "Z," so that the rake wheels are lifted from the ground.

In order to fix the rake wheels in a lifted position, the shaft 51 is surrounded by a blocking member consisting of an arm 61 with two pins 62 and 63, pointing downwards, and a lock 65 at the beam 4, rotatable about a shaft 64. The lock 65 and the pins 62 and 63 cooperate to block the lifting device as hereinafter described.

The device is supported by four running wheels 66, 67, 68 and 69. The running wheels 66 and 67 are rotatably journalled in bearings 70 and 71, which are secured to the longitudinal beam 1 by means of shafts 72 and 73. With the shaft 73 of the running wheel 67 is connected a draw hook 74, by which the device can be drawn. With the shaft 72 of the running wheel 66 is connected a draw hook 75, by which the device can also be drawn. The bearing 70 is provided with an arm 76, to the end of which a locking pin 77 is secured. The shaft 72 of the running wheel 66 is provided with a sector-shaped plate 78 in which holes 79 are provided. By inserting the locking pin 77 into one of the holes 79, the running wheel 66 can be locked against rotation in the bearing 70.

The running wheels 68 and 69 are connected with the groups of rake wheels 9 and 11 respectively. This fastening method will be described more fully for the running wheel 69. To the supporting beam 13 is secured a vertical bearing 80 by means of strips 81 and 82. In the bearing 80 is rotatably supported a vertical shaft 83 (FIG. 6), which is connected at its lower end with a horizontal axle 84 about which the running wheel 69 is rotatable. The shaft 83 is provided just below the bearing 80 with a semi-circular strip 85, which is provided with holes 86. To the bearing 80 is secured a strip 87 to which a curved strip 88 is fastened. The strips 87 and 88 are provided at their ends with holes 89 through which a locking pin 90 extends and which has a collar 91. Between the collar 91 and the strip 88 the pin is surrounded by a spring 92, which tends to urge the collar 91 against the strip 87. On the strip 88 is provided a circular collar 93, which has an inclined upper edge on which the handle of the pin 80 can bear, so that the pin 90 can be fixed in a lifted position in which the collar 91 does not bear on the strip 87. The lower end of the pin 90 can be inserted into one of the holes 86, so that the shaft 83 is locked against rotation in the bearing 80. In the same manner as described above for the running wheel 69, the running wheel 68 is linked with the group of rake wheels 9.

The device operates as follows in the position as shown in the drawing. When the device in FIG. 1 moves in the direction V, the device being drawn by the draw hook 75, the rake wheels will rotate owing to their inclined position with respect to the direction V upon touching the ground. Owing to this rotation the rake wheels will displace the crop laterally. The tines 25 of the rake wheels are orientated backwardly with respect to the direction of rotation of the rake wheels 23, 24, 34, 35 and 36, 37, so that no crop will stick to the tines as they move upwards. When the rake wheels are arranged as shown in FIG. 2, a swath lying on the ground can be effectively turned, while it is at the same time spread and left on the field in a very efficient condition for aeration. This is achieved when the axis of rotation of the leading rake wheel, for example, is at a larger angle to the direction of travel than the axis of rotation of the trailing rake wheel 34. This position of the rake wheels is, at the same time, particularly suitable for frequent turning of a swath in order to promote drying. In this position of the rake wheels, the crop in a frequently turned swath will not be collected in one roll. It will, on the contrary, remain spread out.

Figure 2:
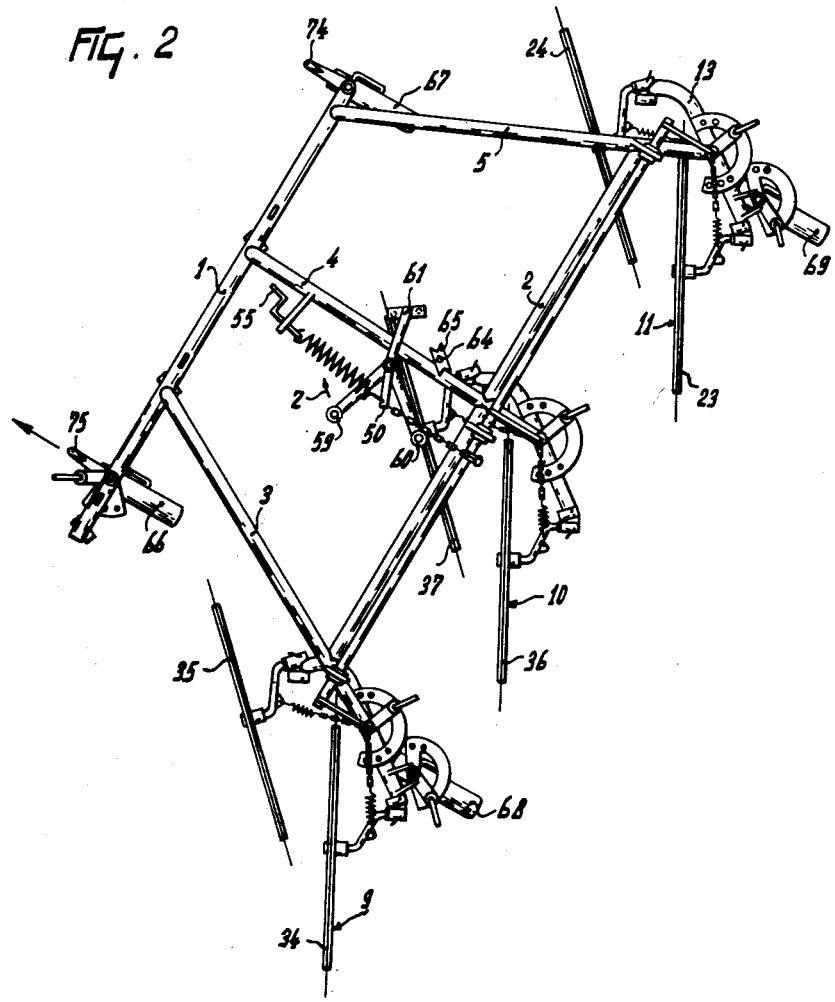
FIGURE 2 is a plan view of the device shown in FIG. 1, in which the rake wheels have been moved to differerent positions.
Figure 3:
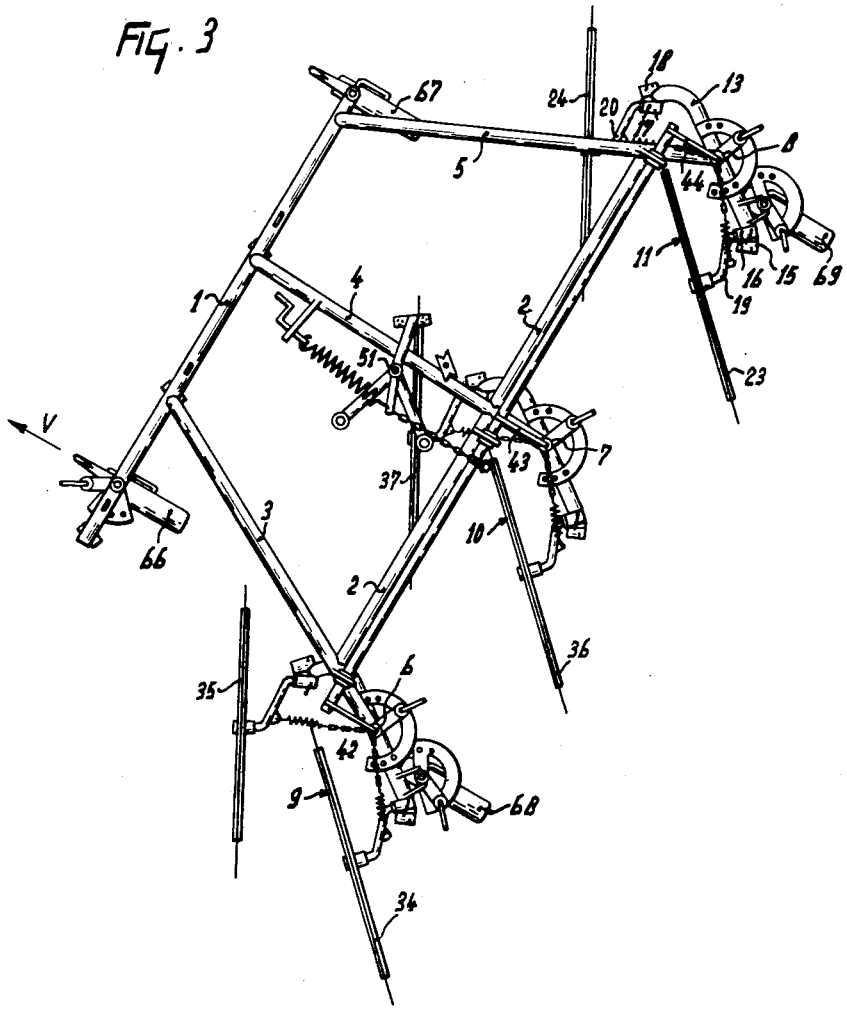
FIGURE 3 is a plan view of the device shown in FIG. 1, in which the rake wheels have been moved to further positions.

As an alternative, the rake wheels may be arranged in a group in the manner shown in FIG. 3. In this case, the axis of rotation of the leading rake wheel 37, for example, is at a greater angle to the direction of travel than the axis of rotation of the trailing rake wheel 36. If the rake wheels of one group are arranged in this manner, a swath lying on the ground is effectively turned, but is spread out to a smaller extent than with the arrangement of the rake wheels of FIG. 2. This arrangement of the rake wheels is particularly suitable for turning a swath, which, after having been turned, is left on the field with a uniform thickness and width, the formed swath not exhibiting accumulations, which is very important if the swath is to be picked up to collect the crop or for other purposes. These different arrangements of the rake wheels, it will be noted, are possible since for each rake wheel two bearings are provided at an angle to one another.

In FIG. 1, the distance between the centers of the rake wheels is larger than in FIGS. 2 and 3, which is achieved by turning the crank 20 through 180° in the bearing 18. This arrangement is particularly suitable for turning a broad swath lying on the ground, since in this case a larger part of the lateral surfaces of the rake wheels is operative than with the other arrangements described above.

By arranging the rake wheels on cranks, each rake wheel can match individually the unevenness of the ground by a turning of the associated crank in its bearing.

It is obvious that, if the various operations described are to be carried out, the rake wheels of all groups must be arranged in the same manner in their respective groups.

As is evident from FIG. 1, the running wheels which support the larger part of the weight of the device are located behind the rake wheels.

In accordance with the plan view of FIG. 4, the groups of rake wheels 9, 10 and 11 can be turned through an angle with respect to the bearings 6, 7 and 8. The device of FIG. 4 constitutes part of a tedder, the device being then drawn in the direction W by the draw hook 74 which is secured to the shaft 73. With this arrangement the rake wheels will each work separately a strip of ground. In this position, the running wheels which support the larger part of the weight of the device are located in front of the rake wheels, so that the crop left behind on the ground by the rake wheels is not compressed by running wheels which would otherwise affect drying adversely. This position may be obtained by releasing the locking pin 30, after which the supporting beam 13 can be turned into the position shown in FIG. 4, the locking pin 30 being inserted into a different hole 27, the supporting beam 13 being thus locked in the new position. Then the locking pin 90 must be released, after which the running wheel 69 can be moved into the new position of FIG. 4, the locking pin 90 being inserted into a different hole 86, so that the running wheel 69 is locked against rotation with respect to the bearing 80. The rake wheels of the further groups can be moved into the new positions in the same manner.

Figure 5:
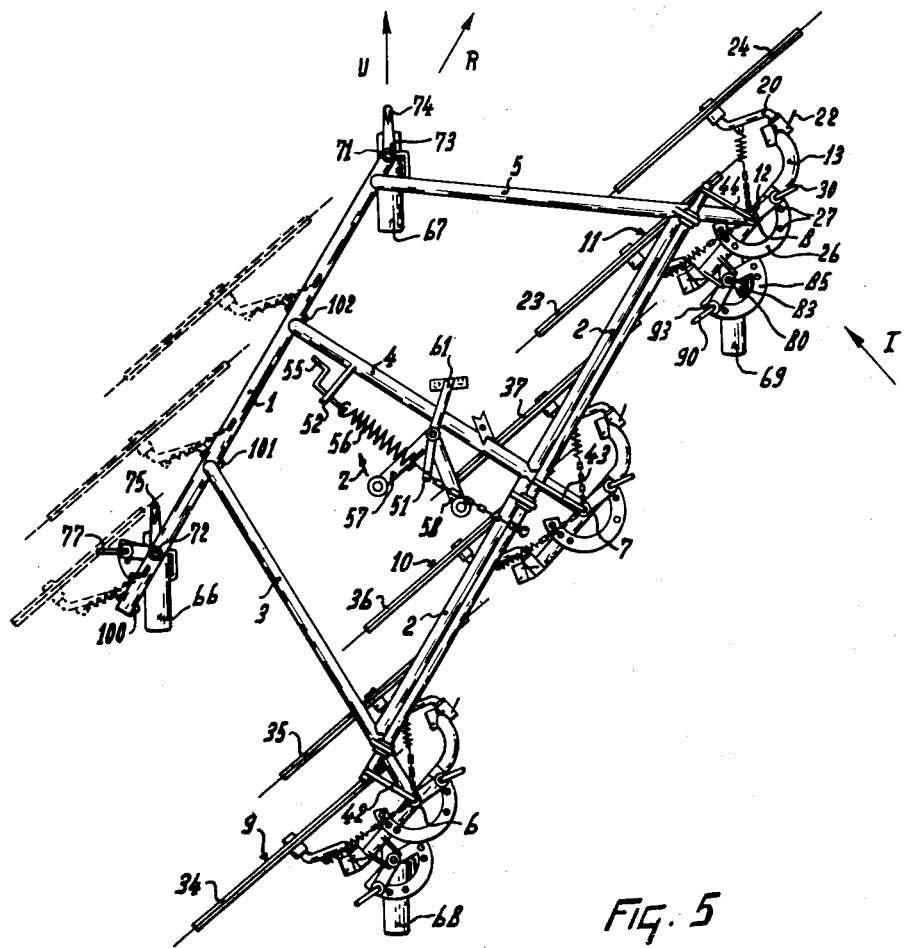
FIGURE 5 shows the device with the rake wheels aligned for a side delivery operation.

According to FIG. 5, the groups of rake wheels 9, 10 and 11 are turned through a smaller angle with respect to the bearings 6, 7 and 8 than in the position shown in FIG. 4. With the position of the rake wheels as shown in FIG. 5, the device constitutes a side delivery rake and is drawn in the direction U. With this arrangement, the rake wheels will work the crop engaged in such a manner that each will displace further in the same direction the crop displaced by the preceding rake wheel.

The position shown in FIG. 5 may be obtained in the same manner as that shown in FIG. 4, but the supports must be turned through a smaller angle with respect to the bearings. In this position, the device is preferably moved by pulling on or near the running wheel 67.

In the position shown in FIG. 5, only the running wheels 38 and 39 are locked against rotation about their vertical shafts, whereas the running wheels 66 and 67 remain as caster wheels.

In the position as shown in FIGURE 1 in which the device constitutes a swath turner, which is capable of working simultaneously three swaths, the line of resistance corresponding to this working position of the device is indicated in the figure by a broken line. It is evident from the figure that the construction of the device is such that the point of application of the tractive force is located substantially on the line of resistance in this working position. The device will then be drawn preferably by the draw hook 75, since the tendency of the device to slip sideways is thus minimized.

In the position shown in FIG. 4 in which the device constitutes a tedder, each of the rake wheels works individually a strip of ground, if the device is travelling in the direction W. The line of resistance associated with this working position of the device, as in the preceding figure, is indicated by a broken line. It is evident from the figure that the draw hook 74 is employed in this position to move the device.

In the position shown in FIG. 5, in which the device is arranged in a manner such that each rake wheel displaces further aside the crop displaced by the preceding rake wheel, the device constitutes a side delivery rake.

In the position shown in FIG. 5, only the running wheels 68 and 69 are locked against rotation about their vertical shafts, as is the case in the position shown in FIG. 1, whereas the running wheels 66 and 67 remain as caster wheels. The line of resistance associated with this working position is also indicated by a broken line. This line of resistance, however, as is evident from the figure, has a course differing from that associated with the working position shown in FIG. 1. The device is constructed in a manner such, however, that also in this position the point of application of the tractive force is located substantially on the line of resistance. In this case, however, the device will be drawn in the direction U by the draw hook 45, which is secured to the other end of the longitudinal beam 1.

As is shown in FIG. 5 with broken lines, it is possible to convert the device into a swath turner, which is capable of turning simultaneously two swaths, each swath being worked by three rake wheels. This working position can be obtained by releasing the rake wheels 34, 35 and 36 with their respective cranks and by mounting the cranks in the bearings 100, 101 and 102, which are secured to the longitudinal beam 1. The device is thus suitable for working heavier swaths than is the case with the device shown in FIG. 1. Also in this position the device will be drawn in the direction U by the draw hook 45, which is also located substantially on the line of resistance associated with this position of the device.

In order to transport the device when inoperative, it is advantageous to make it as narrow as possible. To this end, the running wheels 66, 67, 68 and 69 can be moved into planes which extend parallel to the longitudinal beams 1 and 2. The device is then moved by the draw hook 73 in the driection R, and the running wheels 66 and 68 can be locked against rotation about their vertical shafts.

In order to avoid damage to the tines of the rake wheels, the rake wheels can be brought into a lifted position by means of the lifting device. In order to lift the rake wheels from the ground, a tractive force can be exerted on the arm 50 by turning the levers 57 and 58. The rod 48, which is linked to the arm 50 by means of the chain 49, will turn through an angle, so that the levers 42, 43 and 44 will move upwards and the rake wheels, which are linked with these arms by means of chains and springs, will be free from the ground.

By arranging the rake wheels on cranks, each rake wheel is capable of matching individually the irregularities of the ground since the cranks turn in their bearings. By fastening the rake wheels by means of springs and the levers 42–44 of the lifting device, the pressure of the rake wheels on the ground can be controlled by lowering or raising the levers 42–44.

It is advantageous to arrange the springs on the horizontal crank arms with their top ends facing one another. This facilitates the initiation of the lifting operation which, in other cases, gives rise to great difficulties.

The arms 57 and 58 of the lifting device are arranged preferably with respect to one another in positions differing in a manner such that it is possible to actuate the lifting device by a force exerted on either of the two arms. It is advisable to take into account, when arranging the arms, that the arm should extend transversely to the direction of travel at the instant, when the maximum force is to be exerted on it so that an advantageous transmission of force is insured.

In the working position of the device shown in FIG. 1 use will be preferably made of the arm 58. In the working position of the device shown in FIG. 5, the arm 57 will be preferred. The arms 57 and 58 are provided at their ends with eyes 59 and 60, by which the levers can be coupled with a control-mechanism on the tractor by means of a rod system or a rope (not shown) so that the lifting device can be actuated in a simple manner from the driver's seat on the tractor.

Figure 7:
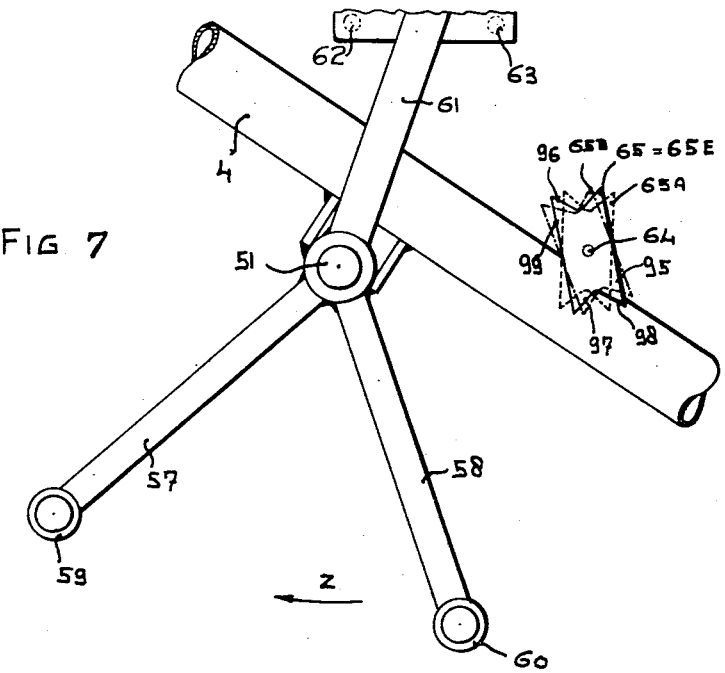
FIGURE 7 is a plan view, on an enlarged scale, of a detail of the device shown in FIG. 1.
Figure 8:
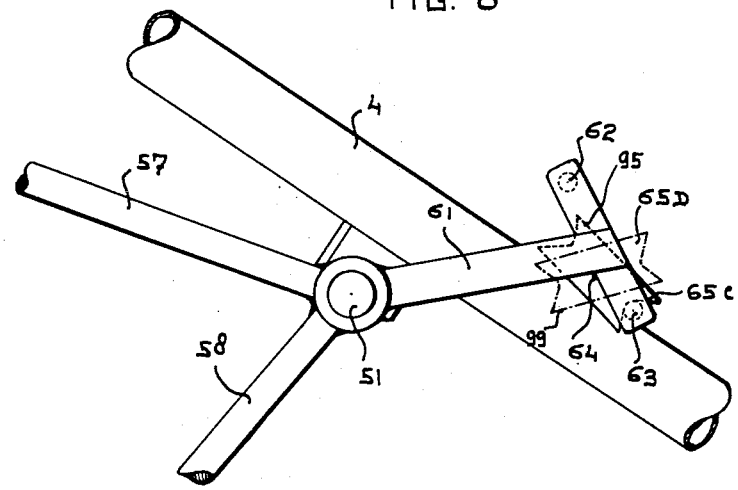
FIGURE 8 shows the detail of FIG. 7 in a different position.

A locking device for locking the lifting device in the lifted position of the rake wheels is shown in FIGS. 7 and 8. By turning the arms 57 and 58, the pin 63 will engage the surface 95 of the lock 65, so that the plate 65 is turned out of its initial position to the position 65A. Then the pin 62 arrives at the side 96 of the plate 65, so that the lock 65 moves to position 65B. Then the force exerted on the levers 57 and 58 is obviated, so that with the pins 62 and 63 these arms turn back owing to the weight of the rake wheels, after which the pin 63 arrives between the surfaces 97 and 98 of the lock 65, which will thus occupy the position 65C.

Since the distance of the center of the shaft 51 from the pin 63 is smaller than the distance of the shaft 51 from the center of the shaft 64 plus the distance of the center of the shaft 64 from the point of intersection of the surfaces 97 and 98 and is larger than the distance of the shaft 51 from the shaft 64 minus the distance of the shaft 64 from the point of intersection of the surfaces 97 and 98, the pin 63 cannot turn further about the shaft 51, so that the lifting device is locked. In order to release the lock, a force must be exerted on the arms 57 or 58 in the direction Z, so that the pin 62 engages the surfaces 95 of the plate 65, this plate thus moving into the position 65B. Then the force exerted on the arm 57 or 58 is obviated, so that the levers 57 and 58 and the pin 63 turn in opposite directions about the shaft 51. Thus the pin 63 arrives at the surface 99 of the plate 65, which occupies the new position 65D, so that the plate 65 will turn into the position 65E, which differs by exactly 180° from the initial position, the rake wheels thus re-engaging the ground.

It is evident from the foregoing, that a force is exerted on the arms 57 and 58 in one direction both for lifting and lowering the rake wheels, when the lifting device is actuated. In order to minimize this force, provision is made of the spring 56, which tends to move the levers 57 and 58 also in the direction Z. In order to minimize the variations in length of the spring, this spring can engage a point near the shaft 51. Since it is advantageous to have a possibility of lifting the rake wheels free from the ground in the various working positions, the lifting device can be operated both when the implement is moved by the draw hook 73 in the directions U, R and W and when it is moved by the draw hook 75 in the direction V. To this end the arms 57 and 58 are provided. When the implement moves in the directions U, R and W, a tractive force can be exerted on the arm 57, whereas during a travel in the direction V, a tractive force can be exerted on the arm 58. By using a lifting device comprising arms such as 57 and 58, which are rotatable about a shaft, the lifting device can be controlled from all sides of the implement.

What we claim is:

1. A device for displacing material lying on the ground, comprising a beam, at least two groups of rake wheels on said beam, the groups displacing said material independently of each other, the rake wheels in each group being disposed at an acute angle with respect to each other; the rake wheels in each group being operatively associated to displace said material in the same general direction.

2. A device as claimed in claim 1, wherein the device has a determinable direction of travel and the rake wheels of a group are operatively associated in leading and trailing relationship and the leading rake wheel is arranged at a greater angle with respect to the direction of travel than the trailing rake wheel.

3. A device as claimed in claim 1, wherein the device has a determinable direction of travel and the rake wheels of a group are operatively associated in leading and trailing relationship and the trailing rake wheel is arranged at a greater angle with respect to the direction of travel than the leading rake wheel.

4. A device as claimed in claim 1 comprising supporting beams operatively associated with and supporting the rake wheels on the first said beam, means connecting said supporting beams to said beam, said means comprising vertical shafts, said supporting beams being individually rotatable about said shafts, and locking means operatively associated with the supporting beams to fix the same in position relative to said shafts.

5. A device as claimed in claim 1 comprising supporting beams operatively associated with and supporting the rake wheels on the first said beam, bearings on the supporting beams, cranks rotatable through substantially 180° in the bearings and operatively associated with the rake wheels to support the latter on said supporting beams.

6. A device as claimed in claim 1 comprising supporting beams operatively associated with and supporting the rake wheels on the first said beam, bearings on the supporting beam for mounting rake wheels on the beam, said bearings being arranged in groups on the supporting beam, the bearings of each group being disposed at an acute angle with respect to each other and the bearings of one group being parallel to the bearings of another group.

References Cited in the file of this patent

UNITED STATES PATENTS

| | | |
|---|---|---|
| 2,597,828 | Spurlin | May 20, 1952 |
| 2,819,578 | Wuster | Jan. 14, 1958 |

FOREIGN PATENTS

| | | |
|---|---|---|
| 512,929 | Belgium | Aug. 14, 1952 |
| 1,081,746 | France | June 9, 1954 |
| 1,111,044 | France | Oct. 19, 1955 |
| 183,982 | Germany | Dec. 10, 1955 |